(12) United States Patent
Shveidel et al.

(10) Patent No.: US 11,042,324 B2
(45) Date of Patent: Jun. 22, 2021

(54) MANAGING A RAID GROUP THAT USES STORAGE DEVICES OF DIFFERENT TYPES THAT PROVIDE DIFFERENT DATA STORAGE CHARACTERISTICS

(71) Applicant: EMC IP Holding Company LLC, Hopkinton, MA (US)

(72) Inventors: Vladimir Shveidel, Pardes-Hana (IL); Anton Kucherov, Dudley, MA (US); Ronen Gazit, Tel Aviv (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 16/397,049

(22) Filed: Apr. 29, 2019

(65) Prior Publication Data
US 2020/0341684 A1    Oct. 29, 2020

(51) Int. Cl.
*G06F 3/06*    (2006.01)
*G06F 11/10*    (2006.01)

(52) U.S. Cl.
CPC .......... *G06F 3/0659* (2013.01); *G06F 3/0619* (2013.01); *G06F 3/0689* (2013.01); *G06F 11/1004* (2013.01); *G06F 11/1076* (2013.01)

(58) Field of Classification Search
CPC ...... G06F 3/065; G06F 3/0659; G06F 3/0685; G06F 3/0689; G06F 11/1076; G06F 11/1004
See application file for complete search history.

(56) References Cited

U.S. PATENT DOCUMENTS

| | | |
|---|---|---|
| 9,811,288 B1 | 11/2017 | Chen et al. |
| 10,082,965 B1 | 9/2018 | Tamilarasan et al. |
| 10,318,163 B2 | 6/2019 | Dalmatov |
| 10,324,633 B2 | 6/2019 | Dalmatov |
| 10,338,825 B2 | 7/2019 | Dalmatov |
| 10,733,051 B2 | 8/2020 | Dalmatov et al. |
| 10,754,573 B2 | 8/2020 | Dalmatov et al. |
| 2010/0262755 A1* | 10/2010 | Becker .................. G06F 11/108 711/103 |
| 2012/0265932 A1* | 10/2012 | Jibbe .................... G06F 3/0631 711/114 |
| 2015/0160999 A1* | 6/2015 | Seo ........................ G11C 29/52 714/6.24 |

(Continued)

FOREIGN PATENT DOCUMENTS

WO    WO-2017079373 A1 *    5/2017    ............ G06F 3/0611

OTHER PUBLICATIONS

Lingfang Zeng et al., "HRAID6ML: A Hybrid RAID6 Storage Architecture with Mirrored Logging", Jul. 9, 2012, IEEE, pp. 1-6 (Year: 2012).*

(Continued)

*Primary Examiner* — Reginald G Bragdon
*Assistant Examiner* — Curtis James Kortman
(74) *Attorney, Agent, or Firm* — BainwoodHuang (57) ABSTRACT

A technique is directed to managing a redundant array of independent disks (RAID) group. The technique involves forming the RAID group from storage devices of different types that provide different data storage characteristics. The technique further involves receiving input/output (I/O) requests, and performing I/O operations on the RAID group in response to the I/O requests.

17 Claims, 7 Drawing Sheets

(56) References Cited

U.S. PATENT DOCUMENTS

2018/0373428 A1* 12/2018 Kan ...................... G06F 12/122

OTHER PUBLICATIONS

Nashwan Yahya Ali et al., "Developed RAID DP With Combined Storage Media", Sep. 8, 2016, IEEE, 2016 Second International Conference on Science Technology Engineering and Management (ICONSTEM), pp. 93-97 (Year: 2016).*

Shishi Tan et al., "Cost-effectively Improving Life Endurance of MLC NAND Flash SSDs via Hierarchical Data Redundancy and Heterogeneous Flash Memory", Sep. 14, 2015, IEEE, 2015 IEEE International Conference on Networking, Architecture and Storage (NAS) pp. 336-344 (Year: 2015).*

* cited by examiner

MANAGING A RAID GROUP THAT USES STORAGE DEVICES OF DIFFERENT TYPES THAT PROVIDE DIFFERENT DATA STORAGE CHARACTERISTICS

BACKGROUND

Conventional data storage systems include storage processors and storage drives. During operation, the storage processors receive host commands from host computers, and process the host commands by storing host data into and retrieving host data from the storage drives on behalf of the host computers.

Some conventional data storage systems implement RAID (redundant array of independent disks) data protection schemes when storing and retrieving the host data. Examples of such RAID data protection schemes include RAID 1 (data mirroring), RAID 5 (block level striping and distributed parity), and RAID 6 (block level striping and double distributed parity). Other well-known RAID levels and/or variations include RAID 4, RAID 10, RAID 5 (4+1), RAID 5 (8+1), RAID 6 (4+2), and so on.

SUMMARY

Unfortunately, there are deficiencies to the above described conventional data storage systems that simply implement RAID data protection schemes on host data. In particular, such RAID data protection schemes store data in homogenous groups of storage drives (i.e., all of the storage drives are of the same type and provide the same storage characteristics).

For example, host data may be stored using RAID 1 (data mirroring) in a homogeneous group of magnetic disk drives, i.e., one copy of the host data being stored in one magnetic disk drive and another copy of the host data being stored in another magnetic disk drive. For write operations, the host data is written to both magnetic disk drives. Additionally, for read operations when the host data is not in cache, the host data is read from either magnetic disk drive. Unfortunately, if faster read times are required, both copies of the host data are moved to a homogenous group of faster storage drives such as into two flash memory drives which are more expensive.

As another example, host data may be stored using RAID 5 (4+1) in a homogenous group of flash memory drives, i.e., 4 data segments and 1 parity segment striped across 5 flash memory drives. Unfortunately, such a situation may be expensive (5 flash memory drives are used) and some flash memory drives may perform significantly more program/erase (PE) cycles than others (i.e., unbalanced wearing of the flash memory drives) due parity being updated each time data is updated.

In contrast to the above-described conventional RAID protection schemes which store data in homogenous groups of storage drives, improved techniques are directed to managing a RAID group that uses storage devices of different types that provide different data storage characteristics, i.e., a heterogeneous group of storage devices. By utilizing different types of storage devices that provide different data storage characteristics in the RAID group, particular operations may be directed (or steered) to the device or devices that provide the best performance. For example, for data that is stored on a mirror consisting of one solid state drive (SSD) and one hard disk drive (HDD), read operations may be processed from the SSD to provide minimal read latency. As another example, for a RAID implementation in which parity segments are updated more often than data segments, the parity segments may be placed on storage devices having the highest write endurances, and so on. Such techniques provide better performance (e.g., shorter latency, balanced wear, etc.) and thus are improvements to data storage technology.

One embodiment is directed to a method of managing a RAID group. The method includes forming the RAID group from storage devices of different types that provide different data storage characteristics. The method further includes receiving input/output (I/O) requests, and performing I/O operations on the RAID group in response to the I/O requests.

In some arrangements, the storage devices of the different types that provide the different data storage characteristics include a first storage device of a first type that provides a first data storage characteristic and a second storage device of a second type that provides a second data storage characteristic. Additionally, forming the RAID group includes forming a particular RAID configuration that stores data in accordance with a particular RAID level (e.g., RAID 1, RAID 5, RAID 6, etc.). The particular RAID configuration includes a portion of the first storage device of the first type and a portion of the second storage device of the second type.

In some arrangements, the first storage device of the first type that provides the first data storage characteristic is a solid state device that has a first data access speed as the first data storage characteristic. Additionally, the second storage device of the second type that provides the second data storage characteristic is a hard disk drive that has a second data access speed as the second data storage characteristic, the second data access speed being slower than the first data access speed.

In some arrangements, the first storage device of the first type that provides the first data storage characteristic is a first solid state device that has a first manufacturer-specified write endurance as the first data storage characteristic. Additionally, the second storage device of the second type that provides the second data storage characteristic is a second solid state device that has a second manufacturer-specified write endurance as second first data storage characteristic, the second manufacturer-specified write endurance being lower than the first manufacturer-specified write endurance.

In some arrangements, the first storage device of the first type that provides the first data storage characteristic is a first hard disk drive that has a first data access speed as the first data storage characteristic. Additionally, the second storage device of the second type that provides the second data storage characteristic is a second hard disk drive that has a second data access speed as the second data storage characteristic, the second data access speed being slower than the first data access speed.

In some arrangements, the first storage device has a first total capacity as the first type and a first cost per unit of storage as the first data storage characteristic. Additionally, the second storage device has a second total capacity as the second type and a second cost per unit of storage as the second data storage characteristic, the second total capacity being larger than the first total capacity, and the second cost per unit of storage being lower than the first cost per unit of storage.

In some arrangements, the storage devices of the different types that provide the different data storage characteristics include a solid state drive that provides a first read speed and a hard disk drive that provides a second read speed that is slower than the first read speed. Additionally, forming the RAID group includes forming a mirror that stores a first copy of data in the solid state drive and a second copy of the data in the hard disk drive.

In some arrangements, performing the I/O operations on the RAID group in response to the I/O requests includes, after the first copy of the data is stored in the solid state drive and the second copy of the data is stored in the hard disk drive and while the first copy of the data and the second copy of the data are available for reading, reading only the first copy of the data from the solid state device in response to a read request.

In some arrangements, the storage devices of the different types that provide the different data storage characteristics include a set of first storage devices having first manufacturer-specified write endurances and set of second storage devices having second manufacturer-specified write endurances that are higher than the first manufacturer-specified write endurances. Additionally, forming the RAID group includes, from at least one first storage device and at least one second storage device, forming a RAID stripe that stores a set of data segments and a set of parity segments.

In some arrangements, the RAID stripe is formed in accordance with a data placement policy that writes parity more frequently than data. Additionally, performing the I/O operations on the RAID group in response to the I/O requests includes, in response to a write command, writing a set of data segments to the set of first storage devices and a set of parity segments to the set of second storage devices.

In some arrangements, the RAID stripe is formed in accordance with a data placement policy that writes data more frequently than parity. Additionally, performing the I/O operations on the RAID group in response to the I/O requests includes, in response to a write command, writing a set of data segments to the set of second storage devices and a set of parity segments to the set of first storage devices.

In some arrangements, the method further includes, after forming the RAID group and prior to receiving the I/O requests, configuring a set of access policies to select among the storage devices of the different types that provide the different data storage characteristics based on operation types of the I/O requests. For example, the storage device that performs the fastest reads may be configured to support read operations, the storage device that has the highest write endurance may be configured to support the majority of write operations, and so on.

In some arrangements, the RAID group includes a first storage device having a first access speed and a second storage device having a second access speed that is slower than the first access speed. Additionally, particular data is initially placed in a first storage device of the RAID group having a first access speed. The method further includes, after a period of time has elapsed in which the particular data has transitioned from initially being considered "hot" to now being considered "cold", migrating the particular data from the first storage device of the RAID group to the second storage device of the RAID group.

In some arrangements, the RAID group resides in data storage equipment that manages host data on behalf of a set of host computers. Additionally, migrating the particular data from the first storage device of the RAID group to the second storage device of the RAID group includes moving, as the particular data, at least some of the host data from the first storage device of the RAID group to the second storage device of the RAID group.

In some arrangements, the RAID group resides in data storage equipment that manages host data on behalf of a set of host computers. Additionally, migrating the particular data from the first storage device of the RAID group to the second storage device of the RAID group includes moving, as the particular data, metadata which identifies the host data from the first storage device of the RAID group to the second storage device of the RAID group.

Another embodiment is directed to data storage equipment which includes memory and control circuitry coupled to the memory. The memory stores instructions which, when carried out by the control circuitry, cause the control circuitry to:
(A) form a RAID group from storage devices of different types that provide different data storage characteristics,
(B) receive input/output (I/O) requests, and
(C) perform I/O operations on the RAID group in response to the I/O requests.

Yet another embodiment is directed to a computer program product having a non-transitory computer readable medium which stores a set of instructions to manage a RAID group. The set of instructions, when carried out by computerized circuitry, causing the computerized circuitry to perform a method of:
(A) forming a RAID group from storage devices of different types that provide different data storage characteristics;
(B) receiving input/output (I/O) requests; and
(C) performing I/O operations on the RAID group in response to the I/O requests.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing a RAID group that uses storage devices of different types that provide different data storage characteristics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique is directed to managing a RAID (redundant array of independent disks) group that includes storage devices of different types that provide different data storage characteristics, i.e., a heterogeneous group of storage devices. By utilizing different types of storage devices that provide different data storage characteristics in the RAID group, particular operations may be performed by the device or devices that provide the best performance. For example, for data that is stored on a mirror consisting of a solid state drive (SSD) and a hard disk drive (HDD), read operations may be processed only from the SSD to provide minimal read latency. As another example, for a RAID implementation in which parity segments are updated more often than data segments, the parity segments may be placed on storage devices having the highest write endurances, and so on. Such a technique provides better performance and thus improves data storage technology.

Figure 1:
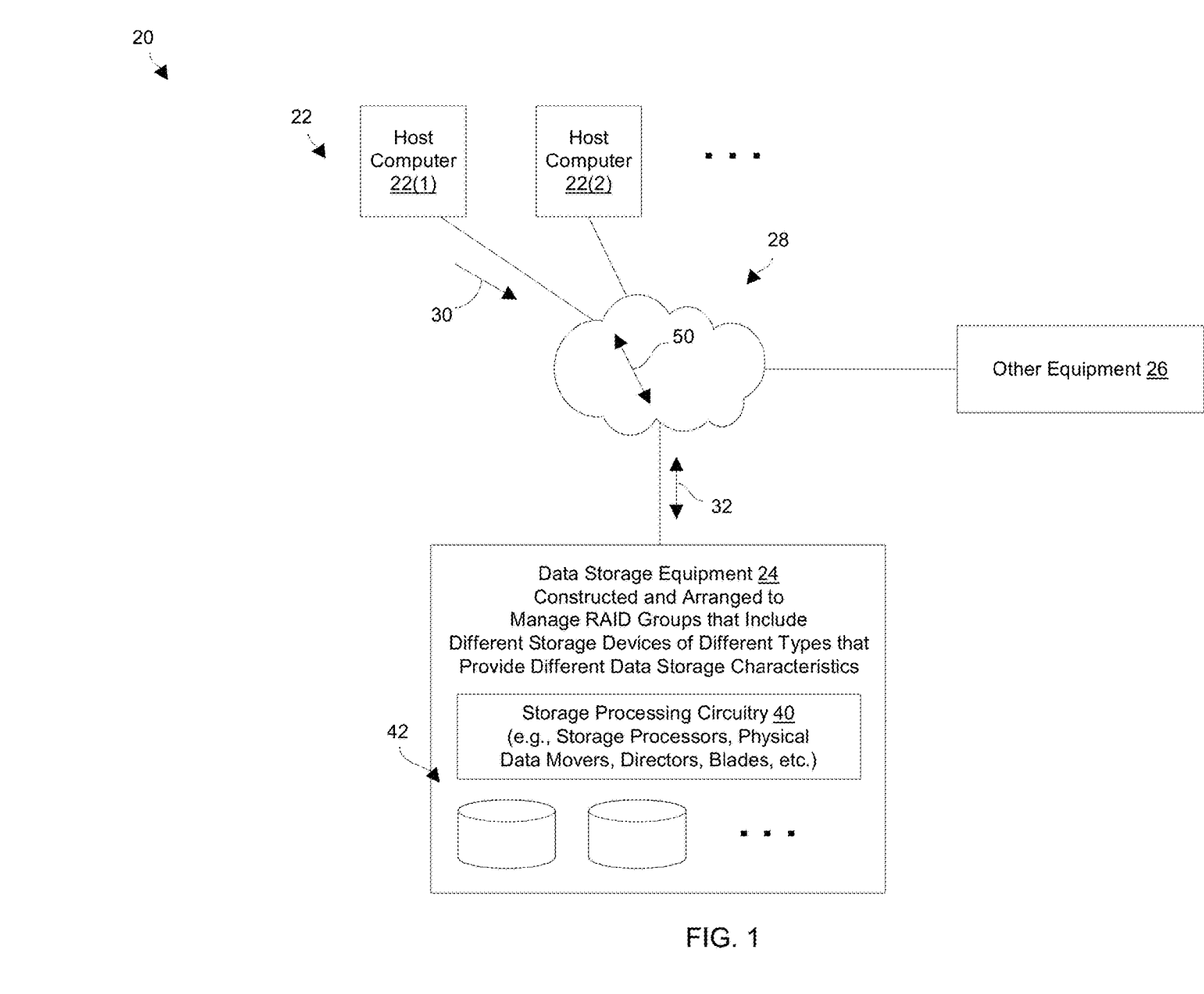
FIG. 1 is a block diagram of a data storage environment which manages a RAID group that uses storage devices of different types that provide different data storage characteristics in accordance with certain embodiments.

FIG. 1 shows a data storage environment 20 which manages a RAID group that uses storage devices of different types that provide different data storage characteristics in accordance with certain embodiments. The data storage environment 20 includes host computers 22(1), 22(2), . . . (collectively, host computers 22), data storage equipment 24, other equipment 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. Other situations are suitable for use as well such as cluster configurations, server farms, cloud infrastructures, enterprise facilities, etc. In these contexts, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage containers (e.g., a file, a file system, a logical unit of storage or LUN, a volume, a virtual volume or VVol, etc.).

The data storage equipment 24 includes storage processing circuitry 40 and storage devices 42 (e.g., solid state drives, magnetic disk drives, etc.). The storage processing circuitry 40 is constructed and arranged to respond to the host I/O requests 30 from the host computers 22 by writing host data 32 into the storage devices 42 and reading host data 32 from the storage devices 42. The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 implements one or more RAID data protection schemes on the data. Such data may include the host data 32, as well as other data such as applications, control data or metadata, logs, and so on. Additionally, the storage processing circuitry 40 may provide a variety of specialized data storage system services such as caching, tiering, prefetching, deduplication, compression, encryption, snapshotting, backup/archival services, replication, and so on.

It should be understood that the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., file-based operations, block-based operations, combinations thereof, etc.

The other equipment 26 represents additional apparatus that may form part of the data storage environment 20 such as service processors, user devices, terminals, enterprise apparatus, backup/archiving/replication sites, management tools and/or diagnostic equipment, other data storage systems, and so on. Such other equipment 26 may communicate with the host computers 22 and/or the data storage equipment 24.

The communications medium 28 is constructed and arranged to connect the various components of the data storage environment 20 together to enable these components to exchange electronic signals 50 (e.g., see the double arrow 50). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting SAN-based communications, LAN-based communications, cellular communications, combinations thereof, etc.

During operation, the host devices 22 send host I/O requests 30 (e.g., SCSI commands, file access commands, combinations thereof, etc.) to the data storage equipment 24 for processing. In response, the storage processing circuitry 40 of the data storage equipment 24 robustly and reliably performs host I/O operations such as writing host data 32 into and reading host data 32 from the storage devices 42.

During such operation, the storage processing circuitry 40 of the data storage equipment 24 manages data within RAID groups that use different storage devices 42 of different types that provide different data storage characteristics. To this end, it should be appreciated that the storage devices 42 may differ in a variety of ways such as media type (e.g., flash memory, magnetic disk drive memory, etc.), storage capacity (e.g., 1 TB, 2 TB, 3 TB, etc.), speed (e.g., 5400 rpm, 7200 rpm, etc.), bus technology (e.g., ISA, PCI, IDE, SATA, SAS, nearline, etc.), program/erase cycle or write endurance, and so on.

Even within certain storage device types, there may be subtypes that distinguish storage devices 42 from each other. For example, among different types of flash memory, there may be single level cell (SLC) flash memory, multi level cell (MLC) flash memory, triple level cell (TLC) flash memory, etc. which have different write times, read times, endurances, costs, power consumption, spin-up time, size/form factor, combinations thereof, and so on. Each combination or permutation of characteristics results in a different type of storage device 42 with different data storage characteristics (e.g., different write speed, different read speed, different write endurance, different cost, different lifetime, etc.).

As data is written to a RAID group and read from the RAID group, the storage processing circuitry 40 decides on where to place the data (e.g., on which storage device or devices 42) and from where to read the data. Such decisions are made to improve or optimize particular performance metrics such as latency, endurance, cost per unit of storage, device longevity, power consumption, combinations thereof, etc. Further details will now be provided with reference to FIG. 2.

Figure 2:
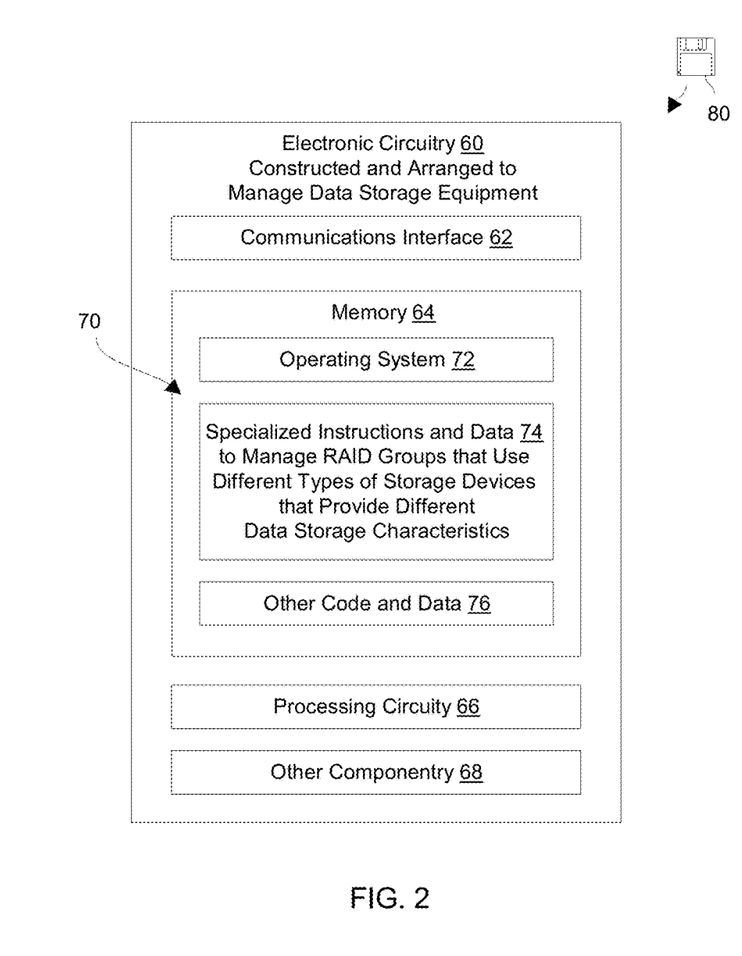
FIG. 2 is a block diagram of particular electronic circuitry of the data storage environment of FIG. 1 in accordance with certain embodiments.

FIG. 2 shows electronic circuitry 60 which is suitable for use within the data storage environment 20 in accordance with certain embodiments. Along these lines, the electronic circuitry 60 may form at least a portion of the storage processing circuitry 40 (also see FIG. 1) which manages RAID groups within the data storage equipment 24. The electronic circuitry 60 includes a communications interface 62, memory 64, and processing circuitry 66, and other componentry 68.

The communications interface 62 is constructed and arranged to connect the electronic circuitry 60 to the communications medium 28 (also see FIG. 1) to enable communications with other devices of the data storage environment 20 (e.g., the data storage equipment 24, the host computers 22, etc.). Such communications may be IP-based, SAN-based, cable-based, fiber-optic based, wireless, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 refers to code that enables electronic circuitry 60 to manage RAID groups that include different types of storage devices 42 that provide different data storage characteristics. In some arrangements, the specialized instructions and data 74 is tightly integrated with or part of the operating system 72 itself. The other code and data 76 refers to applications and routines to provide additional operations and services (e.g., configuration tools, etc.), user-level applications, administrative tools, utilities, and so on.

In some arrangements, at least a portion of the memory 64 is formed by some of the storage devices 42 (FIG. 1). In some arrangements, at least a portion of the memory 64 is separate and distinct from the storage devices 42.

The processing circuitry 66 is constructed and arranged to operate in accordance with the various software constructs 70 stored in the memory 64. As will be explained in further detail shortly, the processing circuitry 66 executes at least some of the specialized instructions and data 74 to form specialized circuitry which manages RAID groups that use different types of storage devices 42 that provide different data storage characteristics.

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as DVD, CD-ROM, flash memory, disk memory, tape memory, and the like.

The other componentry 68 refers to other hardware of the electronic circuitry 60. Along these lines, the electronic circuitry 60 may include one or more storage bus interfaces, a user interface, specialized graphics hardware, etc. Further details will now be provided with reference to FIGS. 3 through 6.

EXAMPLES

In accordance with certain embodiments, specialized circuitry 90 as shown in FIGS. 3 through 6 (which may be formed by processing circuitry 66 operating based on specialized instructions and data 74, also see FIG. 2) manages operation of RAID groups that use different storage devices 42 of different types that provide different data storage characteristics. Such operation enables the specialized circuitry 90 to perform operations using particular storage devices 42 within the RAID groups to provide the best performance (e.g., to reduce latency, to balance wear, etc.).

Figure 3:
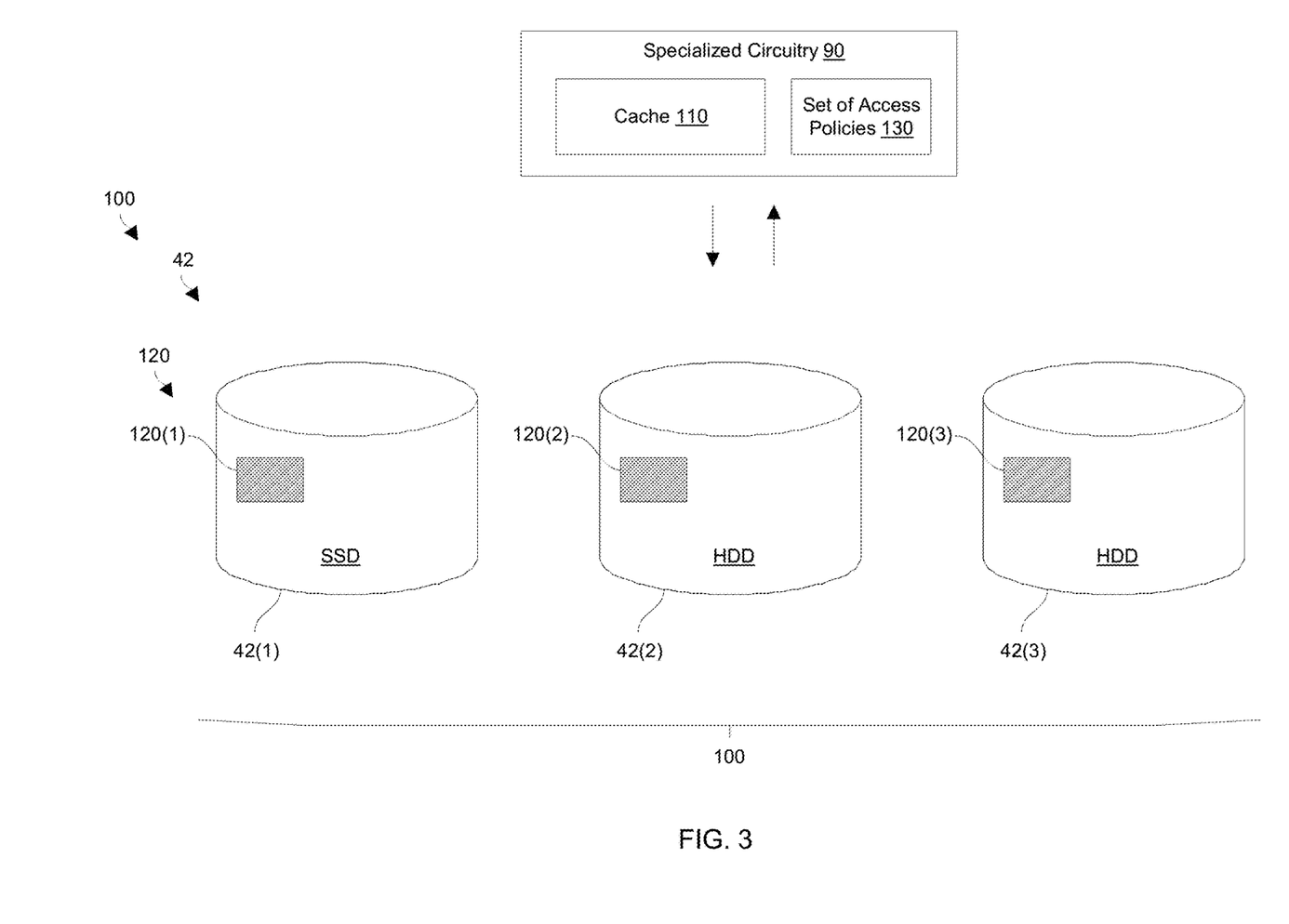
FIG. 3 is a block diagram illustrating particular details in accordance with a first example.
Figure 4:
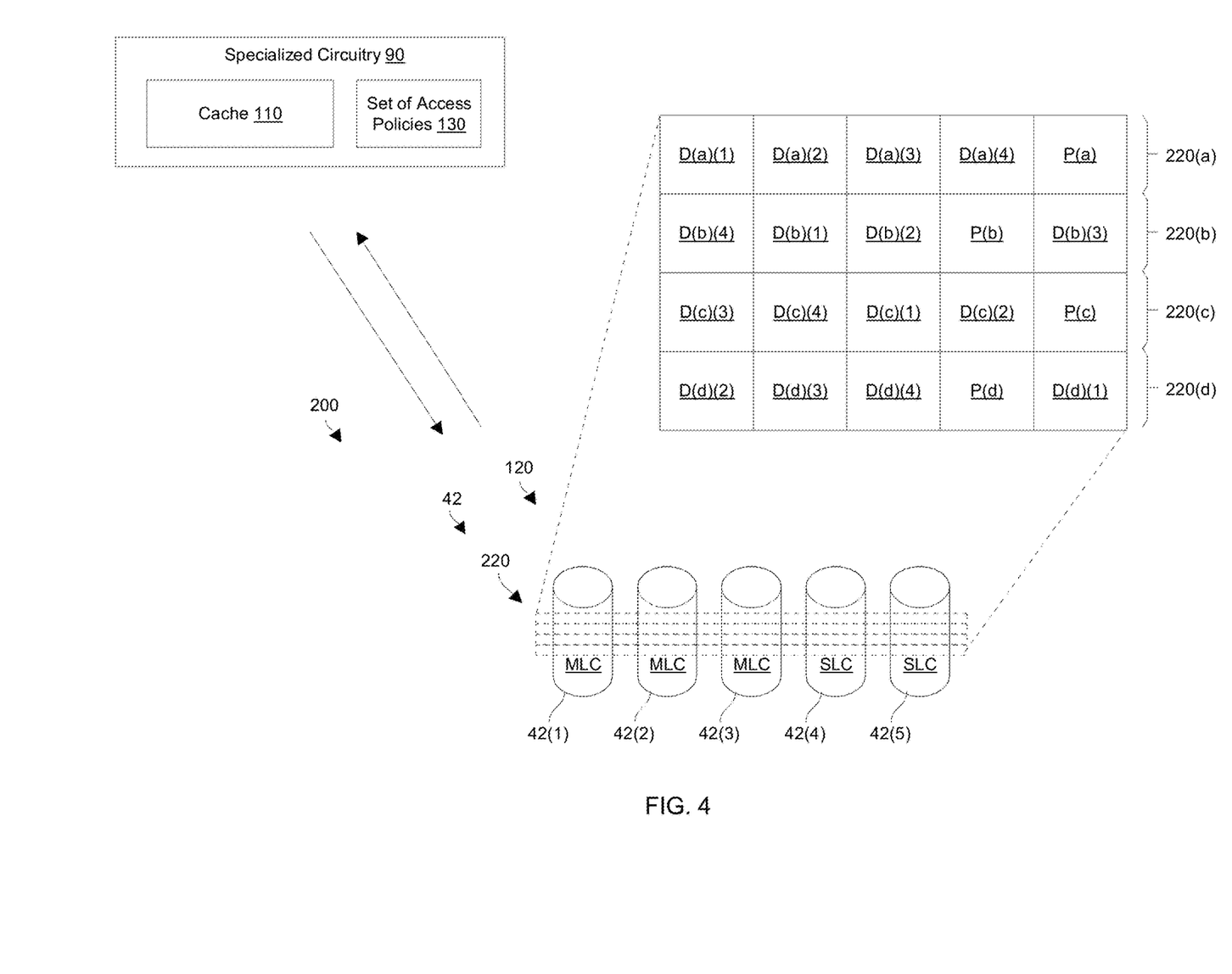
FIG. 4 is a block diagram illustrating particular details in accordance with a second example.
Figure 5:
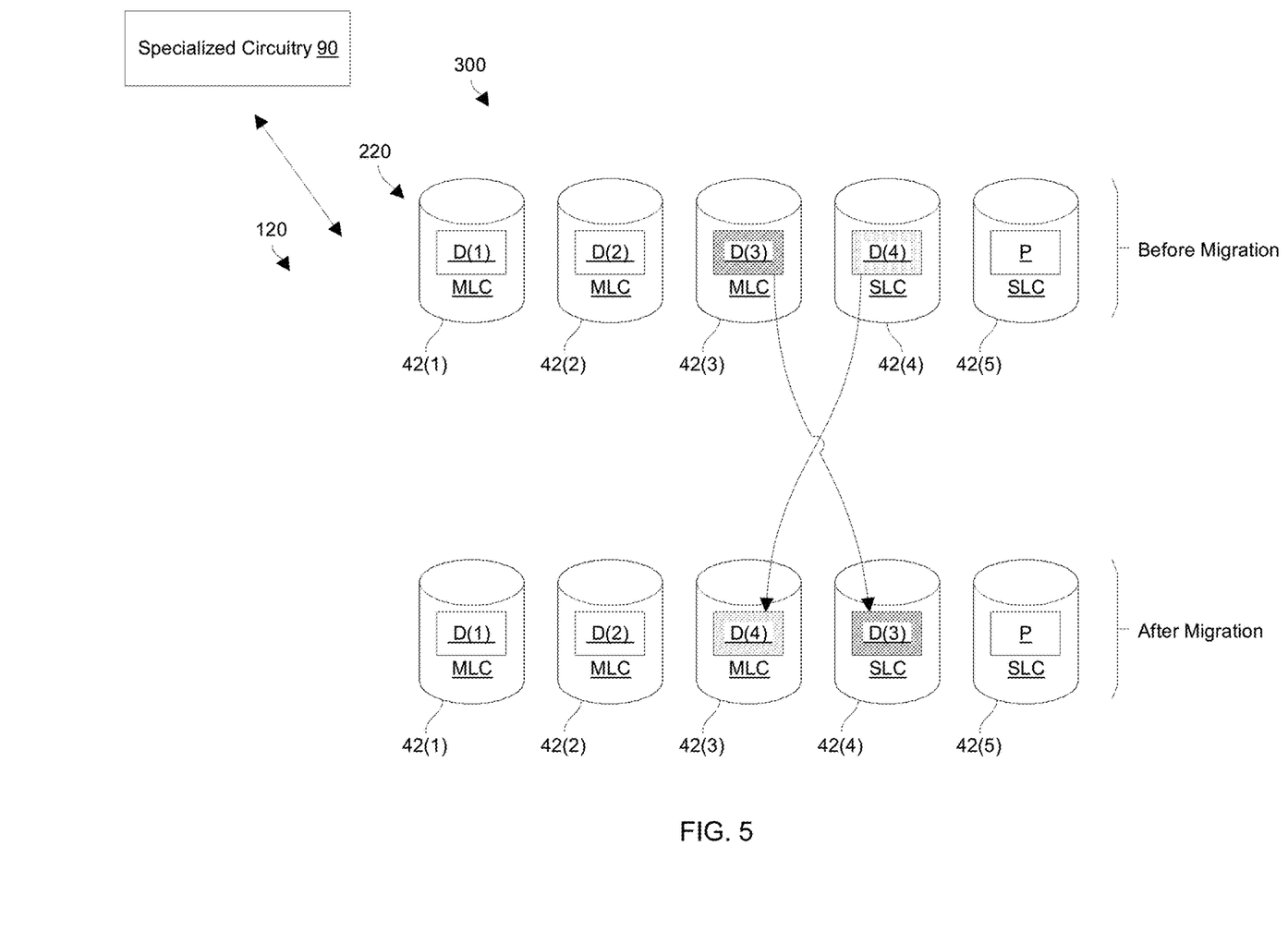
FIG. 5 is a block diagram illustrating particular details in accordance with a third example.
Figure 6:
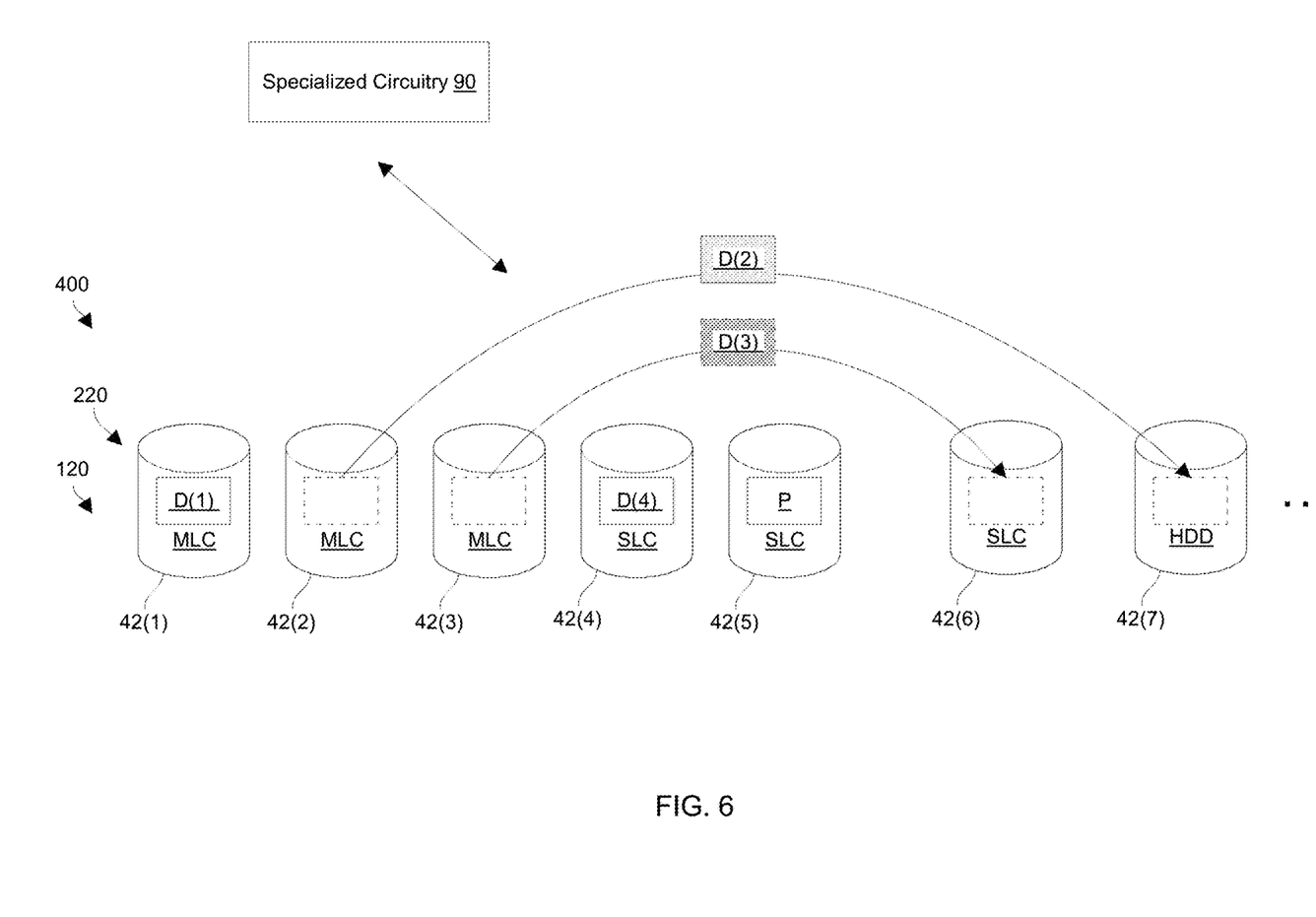
FIG. 6 is a block diagram illustrating particular details in accordance with a fourth example.

FIGS. 3 through 6 show examples of RAID groups that use different storage devices 42 of different types that provide different data storage characteristics. FIG. 3 shows a first RAID group example which implements a 3-way mirror configuration 100 in accordance with RAID 1. FIG. 4 shows a second RAID group example which implements a RAID stripe configuration 200 containing data and parity in accordance with RAID 5. FIG. 5 shows a third RAID group example which involves moving "hot" and/or "cold" segments within a RAID stripe. FIG. 6 shows a fourth RAID group example which involves moving "hot" and/or "cold" segments in response to added data storage capacity.

Mirror Example

FIG. 3 shows a RAID group having a 3-way mirror configuration 100 that includes a first storage device 42(1), a second storage device 42(2), and a third storage device 42(3). By way of example only, the first storage device 42(1) is a solid state device (SSD). Also, the second storage device 42(2) and the third storage device 42(3) are hard disk drives (HDDs).

Further shown in FIG. 3 is the specialized circuitry 90 which includes a cache 110 that buffers data en route to the 3-way mirror configuration 100. In some arrangements, the cache 110 may include a write buffer and a read buffer which may be co-located or separated from each other.

For a write operation, the specialized circuitry 90 may acknowledge completion of the write command before any data 120 is written to the storage devices 42. For example, the specialized circuitry 90 may acknowledge completion of the write command once the data 120 reaches the cache 110 and perhaps is copied to a mirroring cache for redundancy. Accordingly, the write operation may be completed relatively quickly even though the 3-way mirror configuration 100 includes only one SSD (i.e., the storage device 42(1)) and the other storage devices 42(2), 42(3) are HDDs.

To then store the data 120 within the 3-way mirror configuration 100, the specialized circuitry 90 writes the data 120 to each storage device 42. Although the speed of writing to the first storage device 42(1) (an SSD) is on the order of microseconds, writing to the second and third storage devices 42(2), 42(3) may be on the order of millisecond or more (e.g., at least an order of magnitude slower). As shown in FIG. 3, the storage device 42(1) now holds a first copy of the data 120(1), the storage device 42(2) now holds a second copy of the data 120(2), and the storage device 42(3) now holds a third copy of the data 120(3) (e.g., in accordance with RAID 1).

For a read operation, the specialized circuitry 90 needs to read just one copy of the data 120. To this end, the specialized circuitry 90 reads only the first copy of the data 120(1) from the storage device 42(1) since the storage device 42(1) is an SSD that performs the fastest read operations among the storage device 42 of the 3-way mirror configuration 100.

In some arrangements, the specialized circuitry 90 includes a set of access policies 130 that indicate which storage devices 42 are to be accessed for particular operations (also see the specialized instructions and data 74 in FIG. 2). Accordingly, the set of access policies 130 may direct the specialized circuitry 90 to read the copy of the data 120(1) from the storage device 42(1) of the 3-way mirror configuration 100 to provide the best read performance.

It should be understood that the data 120 in this example may be any kind of data. Examples of such include host data 32 (also see FIG. 1), metadata, snapshotted or archived data, log data, and so on.

Moreover, one should appreciate that, even though the example 3-way mirror configuration 100 includes two slower (and less expensive) storage devices 42(2), 42(3) compared to the storage device 42(1), the specialized circuitry 90 is able to provide data storage operation response times as if every storage device 42 of the 3-way mirror configuration 100 was an SSD. Accordingly, the example 3-way mirror configuration 100 requires less sophisticated storage even and may be less costly than a homogeneous group of SSDs.

Other examples may illustrate this point as well. For example, other mirroring configurations may provide a 2-way mirror with one SSD, a 4-way mirror with one SSD, and so on.

RAID 5 Example

FIG. 4 shows a RAID group having a RAID stripe configuration 200 that includes storage devices 42(1), 42(2), 42(3), 42(4), 42(5). Each storage device 42 of the RAID stripe configuration 200 is a SSD. In particular, the storage devices 42(1), 42(2), 42(3) are multi level cell (MLC) SSDs, and the storage devices 42(4), 42(5) are a single level cell (SLC) SSDs.

With respect to data storage characteristics, it should be understood that the SLC SSDs have higher endurance and higher cost per unit of storage than the MLC SSDs. Along these lines, some SLC SSDs may endure 10 times as many program/erase (PE) cycles compared to MLC SSDs. However, MLC SSDs tend to offer higher capacity (and density) than SLC SSDs and thus are less expensive per unit of storage.

Further shown in FIG. 4 is the specialized circuitry 90 which may include a cache 110 and a set of access policies 130 as similarly mentioned above in connection with FIG. 3. That is, data 120 en route to the storage devices 42 and/or from the storage devices 42 may be temporarily buffered within the cache 110. Additionally, the set of access policies 130 may direct the specialized circuitry 90 as to which storage devices 42 to use for particular data storage operations.

It should be appreciated that the specialized circuitry 90 is constructed and arranged to manage the data 120 in RAID stripes 220(*a*), 220(*b*), 220(*c*), 220(*d*), 220(*e*) (collectively, stripes 220) where each RAID stripe 220 includes, by way of example, four data segments (D) and one parity segment (P). For example, the stripe 220(*a*) includes data segments D(a)(1), D(a)(2), D(a)(3), D(a)(4), and parity segment P(a). Similarly, the stripe 220(*b*) includes data segments D(b)(1), D(b)(2), D(b)(3), D(b)(4), and parity segment P(b), and so on.

During operation, the specialized circuitry 90 may modify the data segments (D) and the parity segments (P) of the stripes 220 over time. It should be understood that the parity segment (P) of each stripe 220 is updated each time the data 120 within that stripe 220 is modified, e.g., even if only one data segment (D) of that stripe 220 is modified. Accordingly, for some workloads and data storage configurations in which the parity (P) segments of the stripes 220 tend to be written more frequently than the data segments (D), the specialized circuitry 90 places the parity segments (P) only in the SLC SSDs, i.e., the storage devices 42(4), 42(5). Such operation may be in accordance with one or more of the set of access policies 130.

It should be understood that the data 120 in this example may be any kind of data. Examples of such include host data, metadata, snapshotted or archived data, log data, and so on.

Moreover, one should appreciate that, even though the RAID stripe configuration 200 includes three lower endurance (and less expensive) storage devices 42(1), 42(2), 42(3) compared to the storage devices 42(4), 42(5), the specialized circuitry 90 is able to provide significantly higher overall endurance (i.e., better write performance) without requiring all of the storage devices 42 to be SLC SSDs. In other arrangements, there are different numbers of MLC SSDs and/or SLC SSDs.

Furthermore, other examples may illustrate this point as well such as a RAID 4 or a RAID 6 configuration in which the parity segment(s) of each stripe are distributed only on SLC SSDs, mapped RAID configurations in which a variety of different storage device types are utilized and parity segments (P) are placed only on the higher endurance storage devices 42, and so on.

In alternative arrangements, the workload and/or and data storage configuration may provide a tendency for data segments (D) to be updated more frequently than parity segments (P) (e.g., in a particular mapped RAID configuration). In such a situation, the specialized circuitry 90 may be constructed and arranged (e.g., via the set of access policies 130) to place the data segments (D) on the higher endurance storage devices 42 and the parity segments (P) on the lower endurance storage devices. Other situations and configurations are suitable for use as well.

It should be understood that the configuration of three MLC SSDs and two SLC SSDs was provided by way of example only. Other configurations are suitable for use as well. In some arrangements, the RAID group includes one or more SSDs and one or more HDDs where each SSD is considered to have lower endurance than each HDD. In some arrangements, the RAID group includes more than two different types of storage devices 42 (e.g., SSDs/SAS HDDs/ nearline HDDs), etc.

Data Migration within Existing Internal Tiers of a RAID Group Example

FIG. 5 shows a RAID group having a RAID stripe configuration 300 that includes storage devices 42(1), 42(2), 42(3), 42(4), 42(5). The RAID stripe configuration 300 is similar to that described above in connection with FIG. 4 in that each storage device 42 of the RAID stripe configuration 300 is a SSD. In particular, the storage devices 42(1), 42(2), 42(3) are multi level cell (MLC) SSDs, and the storage devices 42(4), 42(5) are a single level cell (SLC) SSDs.

As shown in the upper row of storage devices 42, data 120 initially resides in a RAID stripe 220 that includes data segments D(1), D(2), D(3), D(4), and a parity segment P. Other RAID stripes 220 or segments of other RAID stripes 220 may reside within the same storage devices 42 at the same time.

During operation, the specialized circuitry 90 may determine that the one or more of the segments has become "cold" and/or one or more of the segments has become "hot". Such a determination may be facilitated by storing access frequency information or counts within metadata (e.g., also see the specialized instructions and data 74 in FIG. 2).

A "cold" segment is a portion of a RAID stripe 220 that has is not written very often. In some arrangements, a particular segment is considered "cold" if a predefined period of time has elapsed (e.g., an hour, four hours, a day, etc.) since that segment was last written. In other arrangements, a particular segment is considered "cold" if that segment was written to less than a predefined number of times within a predefined window of time or time range (e.g., an hour, four hours, a day, etc.). Other criteria for identifying "cold" segments are suitable for use as well (e.g., based on read operations, based on overall access counts, etc.).

Similarly, a "hot" segment is a portion of a RAID stripe 220 that is written to often. In some arrangements, a particular segment is considered "hot" if that segment has been written to within a predefined period of time (e.g., 30 minutes, an hour, two hours, etc.). In other arrangements, a particular segment is considered "hot" if that segment was written to more than a predefined number of times within a predefined window of time or time range (e.g., 30 minutes, an hour, two hours, etc.). Other criteria for identifying "hot" segments are suitable for use as well (e.g., based on read operations, based on overall access counts, etc.).

In the example of FIG. 5, suppose that the specialized circuitry 90 determines that the data segment D(3) currently residing in the storage device 42(3) has become "hot" and that the data segment D(4) currently residing in the storage device 42(4) has become "cold". Since the RAID group of storage devices 42 is heterogeneous in that some storage devices 42 are low endurance devices and some storage devices 42 are high endurance devices, the specialized circuitry 90 may move particular segments to improve overall write performance of the storage devices 42.

As shown by the arrows connecting the upper row of storage devices 42 to the lower row of storage devices 42 in FIG. 5, the specialized circuitry 90 moves the "hot" data segment D(3) from the lower endurance storage device 42(3) to a higher endurance storage device 42 such as the storage device 42(4). Likewise, the specialized circuitry 90 moves the "cold" data segment D(4) from the higher endurance storage device 42(4) to a lower endurance storage device 42 such as the storage device 42(3). As a result, the PE cycles for the storage devices 42 are consumed in a smarter manner and the lifetime of the storage devices 42 is extended.

Moreover, in some arrangements, a data segment of a particular RAID stripe 220 is swapped with a parity segment of that RAID stripe 220. Additionally, nothing precludes moving more than two segments at the same time, e.g., in other arrangements, three segments are moved, four segments are moved, etc. In some arrangements, movement of the segments is facilitated by the cache 110 (also see FIGS. 3 and 4) operating as a temporary data buffer.

Furthermore, nothing precludes swapping segments of different RAID stripes 220. For example, in some arrangements, a "cold" segment of one RAID stripe 220 on a high endurance storage device 42 is swapped with a "hot" segment of another RAID stripe 220 on a low endurance storage device 42. In such arrangements, multiple segments of the same RAID stripe 220 should not reside on the same storage device 42.

It should be understood that the configuration of three MLC SSDs and two SLC SSDs was provided by way of example only. Other configurations are suitable for use as well. In some arrangements, the RAID group includes one or more SSDs and one or more HDDs where the SSDs are considered to have lower endurance than the HDDs. In some arrangements, the RAID group includes more than two different types of storage devices 42 (e.g., SSDs/SAS HDDs/nearline HDDs), etc.

In some arrangements, the specialized circuitry 90 routinely looks for opportunities to move promote "hot" segments and demote "cold" segments over time (e.g., in the background). Such operation may be viewed a form of "tiering within a RAID group", e.g., segments within the same RAID stripe 220 can be moved among different types of storage to improve performance. In some arrangements, a "hot" segment in a low endurance storage device 42 of a RAID stripe 220 is swapped with the "coldest" segment of that RAID stripe 220 residing in a high endurance storage device 42. Other "tiering within a RAID group" scenarios are suitable for use as well (e.g., swapping a "cold" segment in high endurance device 42 with the "hottest" segment in a low endurance storage device 42), and so on.

Data Migration within Internal Tiers of a RAID Group Due to Added Capacity Example FIG. 6 shows a RAID group having a RAID stripe configuration 400 that includes storage devices 42(1), 42(2), 42(3), 42(4), 42(5). The RAID stripe configuration 400 is similar to that described above in connection with FIGS. 3 and 4 in that each storage device 42 of the RAID stripe configuration 400 is a SSD. In particular, the storage devices 42(1), 42(2), 42(3) are multi level cell (MLC) SSDs, and the storage devices 42(4), 42(5) are a single level cell (SLC) SSDs.

Now, suppose that additional data storage capacity is added to the RAID group. For example, suppose that the data storage equipment 24 provides a mapped RAID environment and that storage devices 42(6) and 42(7) are added. In particular, the storage device 42(6) is another SLC SSD, and the storage device 42(7) is a hard disk drive (HDD). Such a situation may exist when the capacity of particular existing storage devices 42 starts becoming scarce and new data storage capacity is introduced to address the situation.

Further suppose that the specialized circuitry 90 identifies a data segment D(3) that currently resides on the storage device 42(3) as being the "hot" and satisfying criteria for promotion to a storage device 42 having higher endurance than that of the storage device 42(3) which is an MLC SSD (e.g., in response to the write frequency now exceeding a predefined threshold). Accordingly, the specialized circuitry 90 may migrate the data segment D(3) from the storage device 42(3) to the storage device 42(6) which is another SLC SSD (e.g., see the arrow for D(3)). As a result, the specialized circuitry 90 transfers the data segment D(3) of the RAID stripe 220 to a different tier within the same RAID group, i.e., to a storage device 42 having higher endurance.

Additionally, suppose that the specialized circuitry 90 identifies a data segment D(2) that currently resides on the storage device 42(2) as being the "coldest" and satisfying additional criteria for further demotion (e.g., where the write frequency has dropped below a predefined threshold). Accordingly, the specialized circuitry 90 may migrate the data segment D(2) from the storage device 42(2) which is an MLC SSD to the storage device 42(7) which is an HDD. As a result, the specialized circuitry 90 has transferred the data segment D(2) of the RAID stripe 220 to yet another tier within the same RAID group.

One should appreciate that moving the data segments D(2) and D(3) to new locations frees up previously consumed data storage space on the storage devices 42(2), 42(3). In particular, the storage devices 42(2), 42(3) now have additional storage space for hold data 120 of the current RAID stripe 220 or even other RAID stripes 220.

It should be understood that the RAID group now has three different types of storage devices 42. In particular, the segments of the RAID stripe 220 are now spread across at least one MLC SSD, at least one SLC SSD, and at least one HDD. Other configurations and combinations are suitable for use as well.

Further Details

Figure 7:
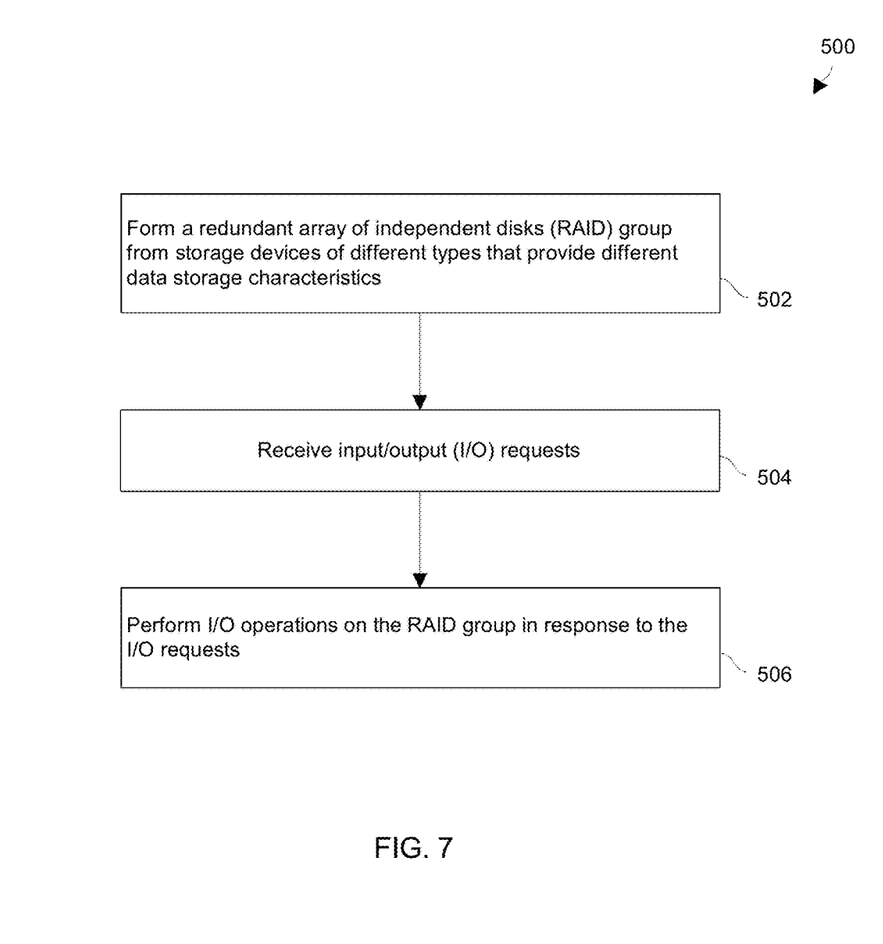
FIG. 7 is a flowchart of a procedure which is performed by the data storage equipment of FIG. 2 in accordance with certain embodiments.

FIG. 7 is a flowchart of a procedure 500 which is performed by specialized circuitry of data storage equipment when managing RAID groups in accordance with certain embodiments. Such a procedure 500 enables the specialized circuitry to perform particular operations using storage devices of the RAID groups that provide the best performance.

At 402, the specialized circuitry forms a RAID group from storage devices of different types that provide different data storage characteristics. Examples of such different types of storage devices include MLC SSDs, SLC SSDs, TLC SSDs, SATA HDDs, SAS HDDs, nearline-SAS HDDs, and so on.

At 404, the specialized circuitry receives input/output (I/O) requests. Such requests may be host requests for host data, metadata, control data, log data, combinations thereof, and so on.

At 406, the specialized circuitry performs I/O operations on the RAID group in response to the I/O requests. For example, for a read command where the data resides in multiple locations, the specialized circuitry may read the data from the storage device that provides the shortest latency. As another example, if the data is a segment of a RAID stripe and the segment is frequently written, the specialized circuitry may place the segment on a storage device that has relatively high endurance, and so on.

As described above, improved techniques are directed to managing a RAID group that uses storage devices 42 of different types that provide different data storage characteristics, i.e., a heterogeneous group of storage devices 42. By utilizing different types of storage devices 42 that provide different data storage characteristics in the RAID group, particular operations may be steered to the storage device or devices 42 that provide the best performance. For example, for data 120 that is stored on a mirror consisting of one solid state drive (SSD) and one hard disk drive (HDD), read operations may be processed from the SSD to provide minimal read latency. As another example, for a RAID implementation in which parity segments are updated more often than data segments, the parity segments may be placed on storage devices 42 having the highest write endurances, and so on. Such techniques provide better performance (e.g., shorter latency, balanced wear, etc.) and thus are improvements to data storage technology.

One should appreciate that the above-described techniques do not merely store data. Rather, the disclosed techniques involve improvements to the technology of data storage. Along these lines, with the techniques disclosed herein, particular advantages are available as well such as reducing read latency, providing better write performance, tiering of data segments within the same RAID stripe, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that there may be situations in which data is written more frequently than parity. For example, in some RAID5 and RAID6 implementations, data is written to clean stripes so parity is not updated. In such situations, parity may be placed on lower endurance storage devices and data may be placed on higher endurance storage devices.

Additionally, there may be situations in low read latency is of importance (e.g., a priority). For such a situation, hotter data for reading is placed on the lower read latency storage devices of the RAID group.

Furthermore, it should be understood that when new storage capacity is added to the system (e.g., new storage devices), only some (but not all) data from a RAID configuration may be moved to the new storage capacity. FIG. 6 illustrates moving particular RAID stripe data segments to the new storage capacity. Other situations are suitable as well such as moving all (or a portion) of one side of a RAID mirror to new storage capacity with lower read latency and then processing read operations to the RAID mirror from the new storage capacity.

It should be appreciated that conventional storage clusters may apply tiering to place different type of data to different type of media (media that fits to data type peculiarity). For example, metadata (MD) pages are usually placed on fast (and so more expensive) media, since MD is a small portion of overall cluster data, but (from the other side) MD access speed usually determine overall cluster performance. Additionally, user data pages (UD) occupying a majority of the cluster capacity is placed on slower (and so cheaper) media.

Another conventional example includes placing "cold" (i.e. rarely accessed) user data on slow drives, while "hot" data is placed on fast drives (or/and drives allowing more number of re-writes). All tiering methods of such type are limited: it requires data classification by properties relevant for tiering. However, such conventional systems don't provide tiering for arbitrary non-classified plain data.

As disclosed herein, certain embodiments involve a "tiering inside resiliency group" approach that address one or more of these limitations. Media/drives tier in a storage cluster are usually organized as a "resiliency group", different type of RAID in regular cases. The main idea is that different drives of the RAID group may have different logical role (and so different access patterns), hence the RAID tier can be optimized by using different drive types in the same RAID group.

Consider the following use cases. First, in a RAID 3-way mirror, all three drives are always involved in write operations. However, the improved circuitry can define a dedicated drive for read operation, and use faster drive for this role. Hence, this RAID array will include two slower (and cheaper) drives that are not used for read operations and one fast (and expensive) drive dedicated for read.

Second, in a RAID 5/6 situation, the parity blocks are not used in regular read operation. Additionally, the parity blocks are more frequently written (since any data block update in stripe causes to parity update). Hence, the improved circuitry can put data blocks on drives optimized for read "operation", while keep parity blocks on drives, providing better write performance and allowing more number of rewrites during life time.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, particular detailed examples were provided for RAID 1 and RAID 5. However, various embodiments are applicable to other data protection schemes. Further example data protection schemes include RAID 4, RAID 10, RAID 5 (4+1), RAID 5 (8+1), RAID 6 (4+2), and so on.

Additionally, it should be understood that in accordance with certain embodiments, the specialized circuitry 90 may implement more than one RAID level. For example, in some arrangements, the specialized circuitry 90 implements more than one of the example configurations provided above. Moreover, the particular improvements disclosed herein are applicable to traditional RAID systems, mapped RAID systems, and so on. Such modifications and enhancements are intended to belong to various embodiments of the disclosure.

What is claimed is:

1. A method of managing a redundant array of independent disks (RAID) group, the method comprising:
   forming the RAID group from storage devices of different types that provide different data storage characteristics;
   receiving input/output (I/O) requests; and
   performing I/O operations on the RAID group in response to the I/O requests;
   wherein the storage devices of the different types that provide the different data storage characteristics include a set of first storage devices having first manufacturer-specified write endurances and a set of second storage devices having second manufacturer-specified write endurances that are higher than the first manufacturer-specified write endurances;
   wherein forming the RAID group includes:
     from at least one first storage device and at least one second storage device, forming a RAID stripe that stores a set of data segments and a set of parity segments;
   wherein the RAID stripe is formed in accordance with a data placement policy that writes data more frequently than parity; and
   wherein performing the I/O operations on the RAID group in response to the I/O requests includes:
     in response to a write command, writing a set of data segments to the set of second storage devices and a set of parity segments to the set of first storage devices.

2. The method as in claim 1 wherein the storage devices of the different types that provide the different data storage characteristics further include a storage device of a first type that provides a first data storage characteristic and a storage device of a second type that provides a second data storage characteristic; and
   wherein the method further comprises:
     forming a particular RAID configuration that stores data in accordance with a particular RAID level, the particular RAID configuration including a particular portion of the storage device of the first type and a particular portion of the storage device of the second type.

3. The method as in claim 2 wherein the method further comprises:
   writing data to and reading data from the particular RAID configuration in response to the I/O requests.

4. The method as in claim 3 wherein the first storage device of the first type that provides the first data storage characteristic is a solid state device that has a first data access speed as the first data storage characteristic;
   wherein the storage device of the second type that provides the second data storage characteristic is a hard disk drive that has a second data access speed as the second data storage characteristic, the second data access speed being slower than the first data access speed.

5. The method as in claim 3 wherein the storage device of the first type that provides the first data storage characteristic is a first solid state device;
   wherein the storage device of the second type that provides the second data storage characteristic is a second solid state device that has a manufacturer-specified write endurance that is lower than that of the first solid state device.

6. The method as in claim 3 wherein the first storage device of the first type that provides the first data storage characteristic is a first hard disk drive that has a first data access speed as the first data storage characteristic;
   wherein the storage device of the second type that provides the second data storage characteristic is a second hard disk drive that has a second data access speed as the second data storage characteristic, the second data access speed being slower than the first data access speed.

7. The method as in claim 3 wherein the storage device of the first type has a first total capacity as the first type and a first cost per unit of storage as the first data storage characteristic;
   wherein the storage device of the second type has a second total capacity as the second type and a second cost per unit of storage as the second data storage characteristic, the second total capacity being larger than the first total capacity, and the second cost per unit of storage being lower than the first cost per unit of storage.

8. The method as in claim 1 wherein the storage devices of the different types that provide the different data storage characteristics further include a solid state drive that provides a first read speed and a hard disk drive that provides a second read speed that is slower than the first read speed.

9. The method as in claim 1 wherein another RAID stripe is formed in accordance with another data placement policy that writes parity more frequently than data.

10. The method as in claim 1, further comprising:
   after forming the RAID group and prior to receiving the I/O requests, configuring a set of access policies to select among the storage devices of the different types that provide the different data storage characteristics based on operation types of the I/O requests.

11. The method as in claim 1 wherein the set of first storage devices includes a first storage device having a first access speed and the set of second storage devices includes a second storage device having a second access speed that is slower than the first access speed;
   wherein particular data is initially placed in the first storage device having the first access speed; and
   wherein the method further comprises:
      after a period of time has elapsed in which the particular data has transitioned from initially being considered "hot" to now being considered "cold", migrating the particular data from the first storage device to the second storage device.

12. The method as in claim 11 wherein the RAID group resides in data storage equipment that manages host data on behalf of a set of host computers; and
   wherein migrating the particular data from the first storage device to the second storage device includes:
      moving, as the particular data, at least some of the host data from the first storage device to the second storage device.

13. The method as in claim 11 wherein the RAID group resides in data storage equipment that manages host data on behalf of a set of host computers; and
   wherein migrating the particular data from the first storage device to the second storage device includes:
      moving, as the particular data, metadata which identifies the host data from the first storage device to the second storage device.

14. The method as in claim 1 wherein forming the RAID group further includes:
   arranging storage segments of the storage devices of different types into a mapped-RAID configuration.

15. The method as in claim 14 wherein forming the RAID stripe includes:
   combining multiple storage segments from multiple first storage devices and multiple storage segments from multiple second storage devices into a RAID structure for holding data in accordance with a particular RAID level.

16. Data storage equipment, comprising:
   memory; and
   control circuitry coupled to the memory, the memory storing instructions which, when carried out by the control circuitry, cause the control circuitry to:
      form a redundant array of independent disks (RAID) group from storage devices of different types that provide different data storage characteristics,
      receive input/output (I/O) requests, and
      perform I/O operations on the RAID group in response to the I/O requests;
   wherein the storage devices of the different types that provide the different data storage characteristics include a set of first storage devices having first manufacturer-specified write endurances and a set of second storage devices having second manufacturer-specified write endurances that are higher than the first manufacturer-specified write endurances;
   wherein the control circuitry, when forming the RAID group, is constructed and arranged to:
      from at least one first storage device and at least one second storage device, form a RAID stripe that stores a set of data segments and a set of parity segments;
   wherein the RAID stripe is formed in accordance with a data placement policy that writes data more frequently than parity; and
   wherein the control circuitry, when performing the I/O operations on the RAID group in response to the I/O requests, is constructed and arranged to:
      in response to a write command, write a set of data segments to the set of second storage devices and a set of parity segments to the set of first storage devices.

17. A computer program product having a non-transitory computer readable medium which stores a set of instructions to manage a redundant array of independent disks (RAID) group; the set of instructions, when carried out by computerized circuitry, causing the computerized circuitry to perform a method of:
   forming the RAID group from storage devices of different types that provide different data storage characteristics;
   receiving input/output (I/O) requests; and
   performing I/O operations on the RAID group in response to the received I/O requests;
   wherein the storage devices of the different types that provide the different data storage characteristics include a set of first storage devices having first manufacturer-specified write endurances and a set of second storage devices having second manufacturer-specified write endurances that are higher than the first manufacturer-specified write endurances;
   wherein forming the RAID group includes:
      from at least one first storage device and at least one second storage device, forming a RAID stripe that stores a set of data segments and a set of parity segments;
   wherein the RAID stripe is formed in accordance with a data placement policy that writes data more frequently than parity; and
   wherein performing the I/O operations on the RAID group in response to the I/O requests includes:
      in response to a write command, writing a set of data segments to the set of second storage devices and a set of parity segments to the set of first storage devices.

* * * * *